(12) United States Patent
Letteri et al.

(10) Patent No.: US 11,487,408 B1
(45) Date of Patent: Nov. 1, 2022

(54) METHOD FOR ASSOCIATING PRODUCTION ELEMENTS WITH A PRODUCTION APPROACH

(71) Applicant: Weta Digital Ltd., Wellington (NZ)

(72) Inventors: Joseph Bruce Letteri, Wellington (NZ); Geo H. Snelling, Wellington (NZ); Matt J. Penman, Wellington (NZ); Rebs Senga Guarina, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/544,476

(22) Filed: Dec. 7, 2021

Related U.S. Application Data

(63) Continuation of application No. 17/364,418, filed on Jun. 30, 2021, now Pat. No. 11,226,726.

(60) Provisional application No. 63/215,696, filed on Jun. 28, 2021.

(51) Int. Cl.
| | | |
|---|---|---|
| *G06F 3/0482* | (2013.01) |
| *G06F 3/0484* | (2022.01) |
| *G06F 16/26* | (2019.01) |
| *G06F 40/205* | (2020.01) |
| *G06Q 10/10* | (2012.01) |

(52) U.S. Cl.
CPC .......... *G06F 3/0482* (2013.01); *G06F 3/0484* (2013.01); *G06F 16/26* (2019.01); *G06F 40/205* (2020.01); *G06Q 10/103* (2013.01)

(58) Field of Classification Search
CPC ...... G06F 3/0482; G06F 3/0484; G06F 16/26; G06F 40/205; G06Q 10/103
See application file for complete search history.

(56) References Cited

U.S. PATENT DOCUMENTS

| 11,226,726 B1 | 1/2022 | Letteri et al. |
| 2019/0213254 A1 | 7/2019 | Ray et al. |

*Primary Examiner* — Andrey Belousov
(74) *Attorney, Agent, or Firm* — Perkins Coie LLP

(57) ABSTRACT

A computer-implemented method for managing associations between production elements and production approaches includes displaying, within a breakdown panel, a representation of at least one scene obtained from a script, the representation including a plurality of production elements; displaying, within an approaches panel, a representation of at least some of the plurality of production elements displayed within the breakdown panel, and associated respective user selection indicators; and displaying, within the approaches panel, a representation of at least one production approach. The method further includes receiving a user selection of at least one production element displayed within the approaches panel; receiving a user selection of the at least one production approach. The selected at least one production element is associated with the selected at least one production approach.

24 Claims, 10 Drawing Sheets

| Environment | Characters | Creatures | Vehicles | Props | Fx |
|---|---|---|---|---|---|

| Name | Type | Bid ID | Scene Count | Shot Count | Scenes | Variants | Notes |
|---|---|---|---|---|---|---|---|
| Josh | | | 1 | 1 | 0001,0010 | base | |
| Jane | | | 1 | 1 | 0001,0010 | base | |

FIG. 5

METHOD FOR ASSOCIATING PRODUCTION ELEMENTS WITH A PRODUCTION APPROACH

CROSS-REFERENCE TO RELATED APPLICATIONS

This application is a continuation of the U.S. utility patent application Ser. No. 17/364,418, filed Jun. 30, 2021, which claims priority to the U.S. provisional patent application Ser. No. 63/215,696 filed Jun. 28, 2021, all of which are incorporated herein by reference in their entirety.

FIELD

The present disclosure generally relates to a planning tool within a production pipeline for a film, television program, stage play, or video game.

BACKGROUND

Existing processes within a production pipeline for a film, television program, stage play, or video game tend to be very mechanical. A user reads a script and breaks the script down and identifies constituent parts that are called out in the script. These parts are often maintained in a spreadsheet application. Such spreadsheet applications tend to lack the customization needed for them to function as efficient data input tools as part of the production process for a film, television program or video game.

Another problem with existing data input tools is that they tend to be suited to a particular type of user performing a particular function. For example, a spreadsheet that is configured to enable a first user to identify and record production elements within a script may not be suitable for a second user working elsewhere in the production pipeline.

It is an object of at least preferred embodiments to address at least some of the aforementioned disadvantages. An additional or alternative object is to at least provide the public with a useful choice.

SUMMARY

A computer-implemented method for managing associations between production elements and production approaches is provided. The method comprises, under the control of one or more computer systems configured with executable instructions: displaying, within a breakdown panel, a representation of at least one scene obtained from a script, the representation including a plurality of production elements; displaying, within an approaches panel, a representation of at least some of the plurality of production elements displayed within the breakdown panel, and associated respective user selection indicators; and displaying, within the approaches panel, a representation of at least one production approach. The method further includes receiving a user selection of at least one production element displayed within the approaches panel; and receiving a user selection of the at least one production approach. The selected at least one production element is associated with the selected at least one production approach.

The method may further comprise displaying, within the breakdown panel, a plurality of cells within a plurality of script rows, the representation of the at least one scene displayed within a plurality of cells within at least one of the script rows.

The method may further comprise displaying, within the breakdown panel, at least some of the plurality of cells within a plurality of production approach columns, at least some of the plurality of production approaches associated to respective production approach categories.

The method may further comprise on receiving a user selection, within the breakdown panel, of at least one cell of the plurality of cells: displaying, within the approaches panel, a representation of at least one production approach associated with the user-selected cell; and displaying, within the approaches panel, a representation of at least one production element associated with the user-selected cell.

The method may further comprise on receiving a user definition of a new production element within the breakdown panel: displaying the new production element in an element panel and/or the approaches panel.

The method may further comprise on receiving a user amendment of a production element within the breakdown panel: displaying the amended production element in an element panel and/or the approaches panel.

The method may further comprise on receiving a user amendment of a production element within an element panel: displaying the amended production element in the breakdown panel and/or the approaches panel.

The method may further comprise displaying, within a category panel, a representation of at least one production element; and receiving, within the category panel, a user definition of a variant based at least partly on the at least one production element displayed in the category panel.

The method may further comprise displaying, within the breakdown panel, at least some of the plurality of cells within a plurality of production element columns, at least some of the plurality of production elements columns associated to respective production element categories.

The method may further comprise displaying an approaches workspace within the approaches panel; and presenting the representation of at least one production approach within the approaches workspace.

The method may further comprise displaying an elements workspace within the approaches panel; and presenting the representation of at least some of the plurality of production elements and associated respective user selection indicators within the elements workspace.

A computer system for managing associations between production elements and production approaches is provided. The system comprises: at least one processor; and a computer-readable medium storing instructions. The instructions, when executed by the at least one processor, cause the system to: display, within a breakdown panel, a representation of at least one scene obtained from a script, the representation including a plurality of production elements; display, within an approaches panel, a representation of at least some of the plurality of production elements displayed within the breakdown panel, and associated respective user selection indicators; display, within the approaches panel, a representation of at least one production approach; receive a user selection of at least one production element displayed within the approaches panel; receive a user selection of the at least one production approach; and associate the selected at least one production element with the selected at least one production approach.

A non-transitory computer-readable storage medium storing instructions is provided. The instructions, when executed by at least one processor of a computer system, cause the computer system to carry out a method for managing associations between production elements and production approaches. The method comprises: displaying, within a breakdown panel, a representation of at least one scene obtained from a script, the representation including a plurality of production elements; displaying, within an approaches panel, a representation of at least some of the plurality of production elements displayed within the breakdown panel, and associated respective user selection indicators; displaying, within the approaches panel, a representation of at least one production approach; receiving a user selection of at least one production element displayed within the approaches panel; receiving a user selection of the at least one production approach; and associating the selected at least one production element with the selected at least one production approach.

A computer-readable medium carrying instructions is also provided. The instructions, when executed by at least one processor of a computer system, cause the computer system to carry out a method for managing associations between production elements and production approaches. The method comprises: displaying, within a breakdown panel, a representation of at least one scene obtained from a script, the representation including a plurality of production elements; displaying, within an approaches panel, a representation of at least some of the plurality of production elements displayed within the breakdown panel, and associated respective user selection indicators; displaying, within the approaches panel, a representation of at least one production approach; receiving a user selection of at least one production element displayed within the approaches panel; receiving a user selection of the at least one production approach; and associating the selected at least one production element with the selected at least one production approach.

BRIEF DESCRIPTION OF THE DRAWINGS

Various embodiments in accordance with the present disclosure will be described with reference to the drawings, in which:

FIG. 5 shows an example of element panel from FIG. 2.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
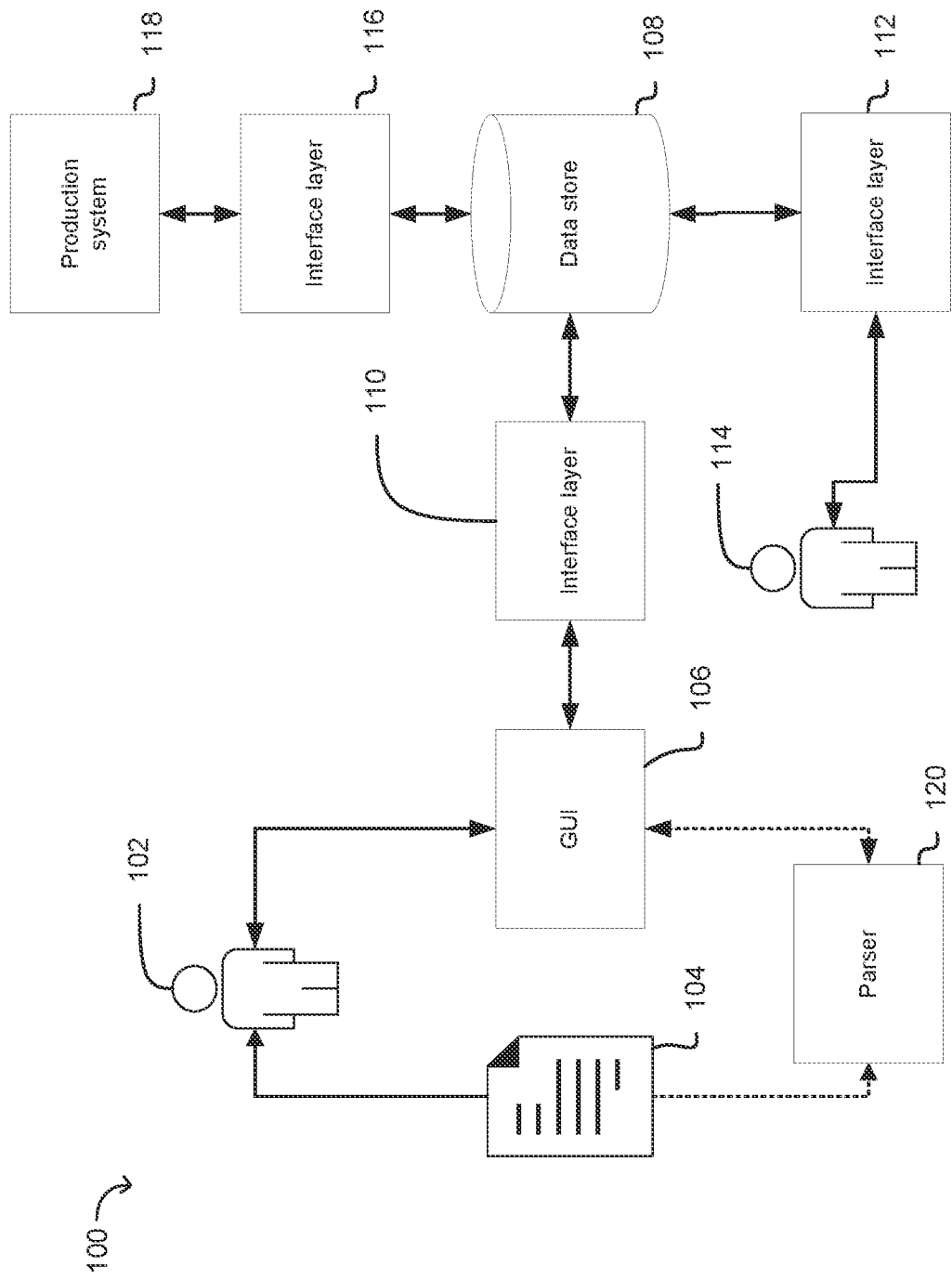
FIG. 1 is a diagram of a system for defining and managing production elements and production approaches.

FIG. 1 shows a system 100 for defining and managing production elements and production approaches. As will be more particularly described below, a user 102 is provided with a script 104. Script 104 or screenplay is typically a written work in digital or paper form. Script 104 is typically presented in plain text form for humans to consume. It is a written work that is used in the production of a film, television program, stage play, or video game.

Script 104 includes natural language descriptions of narrative elements that describe a particular scene or multiple scenes in a film, television program or video game. Narrative elements may also be associated with one or more characters.

As part of a production process for a film, television program or video game, user 102 parses script 104 to define production elements within the script. As will be described below, production elements include, for example, characters, creatures, vehicles and props. Production elements are typically associated with nouns and represent objects in a script.

User 102 also defines production approaches from script 104. One function of a production approach is to specify a relationship between two or more production elements. For example, a particular scene may call for a character to hold a prop. Approaches are often intended to be reused. For example, the same production approach 'character holding prop' may be used in several different scenes.

Production approaches are typically associated with verbs in a script. A production approach, for example, may specify how something will be done and which department or group of users within the production pipeline will be doing the work.

This task of identifying and defining production elements and production approaches has the potential to be a tedious task. Maintaining relationships between production elements and scenes, between production approaches and scenes, and between production elements and production approaches is a difficult task that is prone to error. One issue is that relationships between the various elements of a script may change before, during or after filming. These changes to relationships may be difficult to implement if they need to be located and updated manually.

Furthermore, a single sentence in a script has the potential to involve multiple approaches. For example, several elements and approaches can be inferred from the sentence 'Jake is swimming in the water'. Elements are the character 'Jake' and water. Jake is engaged in the motion of swimming. An approach can include special effects involving water. Another approach can include wet shading of the character's skin. The wet shading of the Jake's skin can be a variant of the character Jake, described below. A third approach can include an animation effect of splashing in the water caused by the character. The inference can be made using a trained machine learning/artificial intelligence model that takes as input natural language description, such as the script, or a portion of the script, and infers the appropriate approaches and elements.

Figure 8:
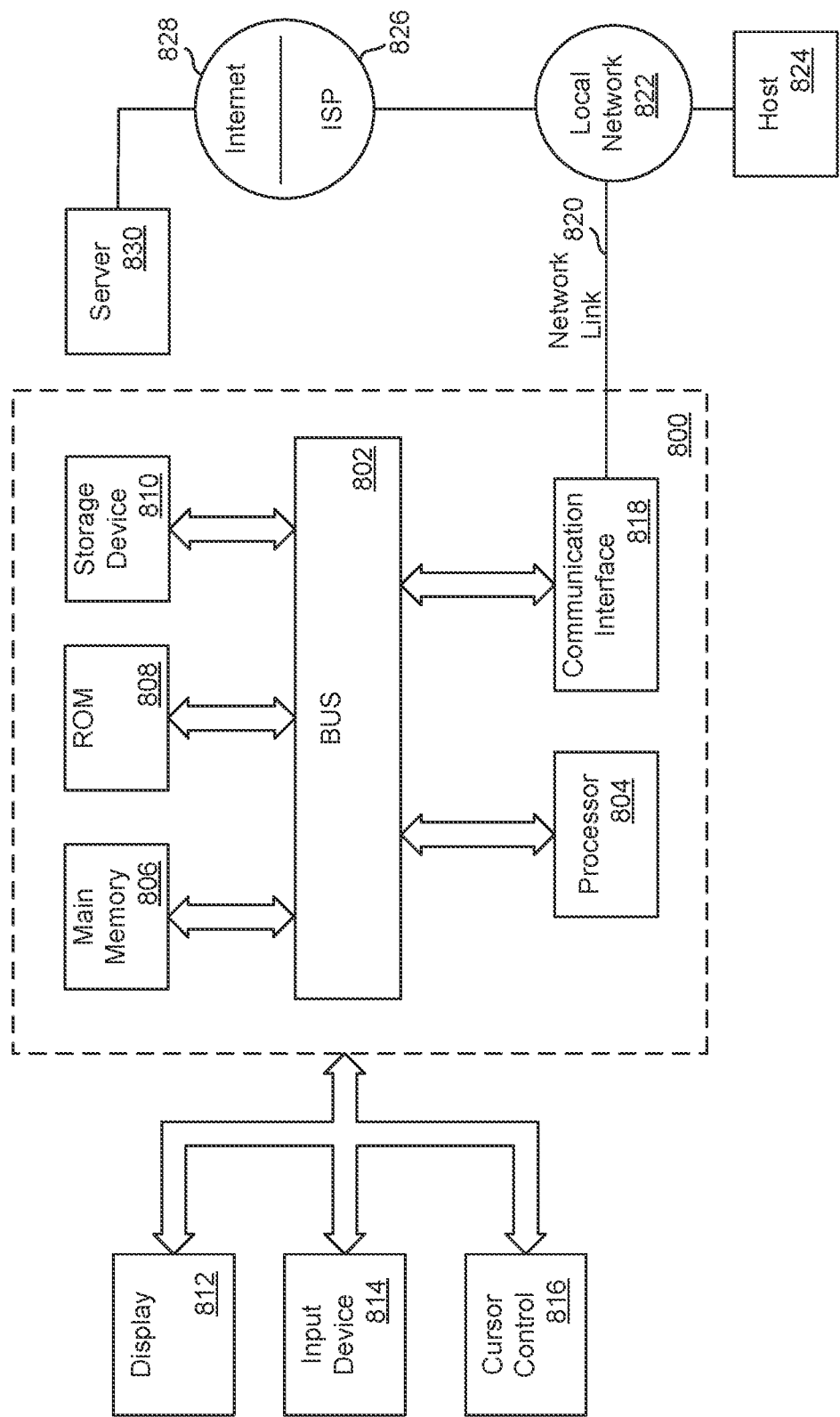
FIG. 8 is a block diagram illustrating an example computer system upon which computer systems of the systems illustrated in FIGS. 1 and 9 may be implemented.

In an implementation, user 102 operates a computer system such as computer system 800 shown in FIG. 8. User 102 may operate, for example, input device 814 and cursor control 816 in order to enter to enter data to be stored in main memory 806, storage device 810 and/or server 830. User 102 is provided with display 812 in order to assist with data entry and data editing. Graphical User Interface (GUI) 106 is provided on, for example, display 812 to assist the user with data entry and data editing. An example GUI 106 is shown at 200 in FIG. 2 below.

In an implementation, GUI 106 comprises a Qt widget that provides user 102 with a tool in which enter, for example, production elements, production approaches, and relationships between these components. In an implementation, at least some of the relationships are configured manually by user 102. In an implementation, at least some of the relationships are configured by business-logic automation within GUI 106.

Various elements of script 104 are maintained in data store 108. In an implementation, data store 108 is maintained in main memory 806, storage device 810 and/or server 830 (see FIG. 8). In an implementation, data store 108 is maintained in a computer system other than computer system 800. In an implementation, data store 108 is maintained over multiple computer systems.

In an implementation, data store 108 comprises a relational database that is configured to store tables of objects including production elements, production approaches, and variants as will be further described below.

Interface layer 110 may be positioned between GUI 106 and data store 108. In an implementation, interface layer 110 performs logic as required to map tables and relationships in data store 108 to data suitable for display and editing within GUI 106. The interface layer 110 can process user input received through the GUI 106.

In an implementation, system 100 includes second interface layer 112 configured for use by user 114. User 114 may, for example, add, delete or amend data maintained in data store 108 through interface layer 112 as an alternative to GUI 106 and interface layer 106.

System 100 may include third interface layer 116. In an implementation, interface layer 116 is configured to map data retrieved from data store 108 to at least one production system 118. Examples of suitable production system include asset and/or task management tools such as Shotgun, and digital creation software such as Maya, Houdini, and Nuke.

Interfaces such as second interface layer 112 and third interface layer 116 have the potential to provide bespoke linking of elements across entire film and across different parts of the film.

In an implementation, system 100 may include parser 120. Script 104 is provided as input to parser 120. Parser 120 may be implemented, for example as computer-executable instructions that cause processor 804 within computer system 800 to perform at least some of the functions of parser 120 described below.

Figure 2:
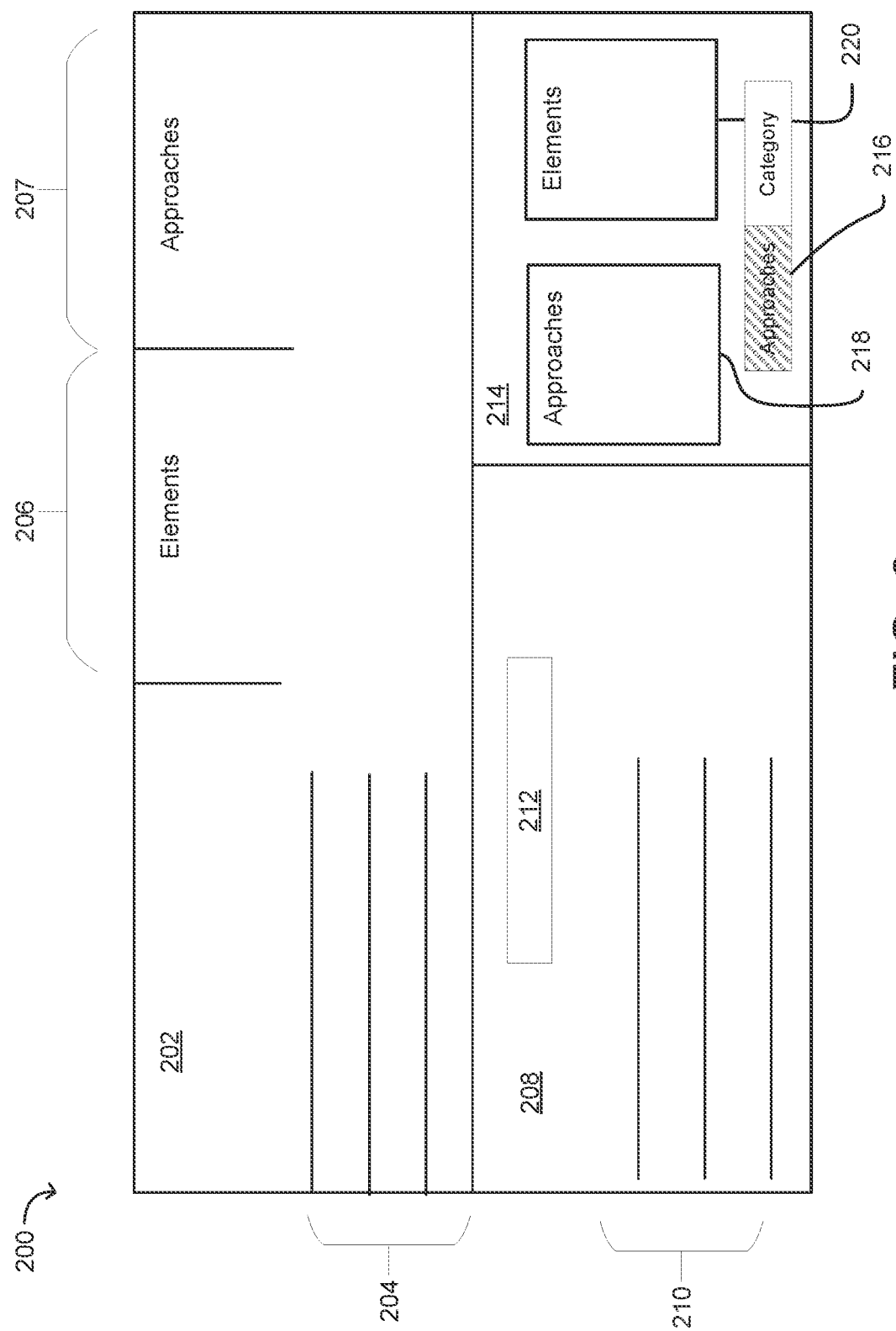
FIG. 2 shows an example of a GUI window presented to a user as part of the system of FIG. 1.

FIG. 2 shows an example of a window 200 of the GUI 106 presented to, for example, user 102 (See FIG. 1). In an implementation, window 200 is presented on display 812 for viewing by user 102.

In an implementation, window 200 includes breakdown panel 202. A more detailed example of breakdown panel 202 is shown below in FIG. 3 and FIG. 4. In an implementation, user 102 enters scenes or shots identified from script 104. For example, the user may enter a scene or shot as respective rows of data within breakdown panel 202. Examples of rows are shown at 204. In an implementation, respective rows are associated to just one scene or shot in script 104.

Breakdown panel 202 may be referred to as an 'initial' breakdown panel by those users who view a script as being prominent. Such users would position the breakdown panel 202 in a prominent or dominant position on display 812.

Breakdown panel 202 may further include at least one production element. Production elements may comprise objects or collections of objects that appear within a selected scene. Production elements may be further grouped into categories. Examples of categories include environment, characters, creatures, vehicles, and props.

Breakdown panel 202 may further include at least one production approach. Production approaches include animation approaches, art approaches, camera approaches, compositing approaches, creatures approaches, and facial models approaches. At least some of these production approaches are associated with respective departments or work groups within a production pipeline. An animation approach may signal the requirement for a set of tasks by an animation department. A facial models approach may signal the requirement for a set of tasks by a facial models department.

Even though the tasks may be performed by different departments, GUI 200 has the potential to provide a centralized repository of information that all departments may contribute back to.

In an implementation, breakdown panel 202 presents a plurality of columns. In an implementation, respective columns are associated to a production category selected from a plurality of production categories. Examples of production categories include production elements category 206 and production approaches category 207. Respective columns are associated to just one production category and are grouped together based on production category. Instances of production elements and production approaches appear as lists of production elements and production approaches at the respective intersections of rows representing scenes, and columns representing categories of production elements and production approaches.

In an implementation, parser 120 (see FIG. 1) is configured to perform natural language processing on the text of script 104. Parser 120 may identify, for example, production elements that are called out within script 104. At least one of these production elements identified by parser 120 is added to breakdown panel 202 either manually by user 102 or automatically by parser 120.

In an implementation, parser 120 is configured to perform artificial intelligence inference on the text of script 104 and/or on production elements identified by parser 120 within script 104. Parser 120 may, for example, perform automated inference to identify at least one production element and/or at least one production approach. For example, parser 120 can use natural language processing (NLP) to identify elements and approaches contained in the text of script 104. Production element(s) and/or production approach(es) inferred by parser 120 may be added to breakdown panel 202 either manually by user 102 or automatically by parser 120.

Described above is an example of a single sentence in script 104 from which multiple approaches may be inferred, 'Jake is swimming in the water'. Parser 120 may perform automated inference on this part of script 104 to infer that 'Jake' is a character which is a type of production element. This production element may then be added to breakdown panel 202. Additionally, parser 120 can infer that water is an element and add "water" to breakdown panel 202.

As described above, several approaches can be inferred from the sentence 'Jake is swimming in the water'. One of these approaches is that Jake is engaged in the motion of swimming. In an implementation, parser 120 is configured to perform automated inference that Jake is performing a motion characteristic of swimming. Other approaches may similarly be determined and added to breakdown panel 202 by automated inference, such as the scene includes special effects involving water, the skin of the character is wet, and there is an animation effect of splashing in the water caused by the character.

In an implementation, GUI 106 is configured to perform automated inference on the contents of breakdown panel 202 for example. As user 102 enters data into breakdown panel 202, GUI performs automated inference to identify elements and/or approaches to add to breakdown panel 202.

For example, the step of user 102 adding a representation of 'Jake is swimming in the water' to breakdown panel 202 may cause GUI 106 to add one or more approaches to breakdown panel 202. Examples of these approaches include one or more of Jake is performing a motion characteristic of swimming, the scene includes special effects involving water, the skin of the character is wet, and there is an animation effect of splashing in the water caused by the character.

In an implementation, GUI 106 may be configured to perform automated inference to identify and add additional production elements to breakdown panel 202 as user 102 populates breakdown panel 202 manually.

In an implementation, window 200 includes element panel 208. A more detailed example of element panel 208 is shown below in FIG. 5.

Element panel 208 presents a plurality of rows. Examples of rows are shown at 210. Respective rows are associated to just one production element. Element panel 208 may include for example, production element filter 212. In an implementation, production element filter 212 is configured to receive a selection from user 102 associated to a production element category. Once a filter is selected, only those production elements matching the selected production element category are displayed as rows within element panel 208.

Figure 6:
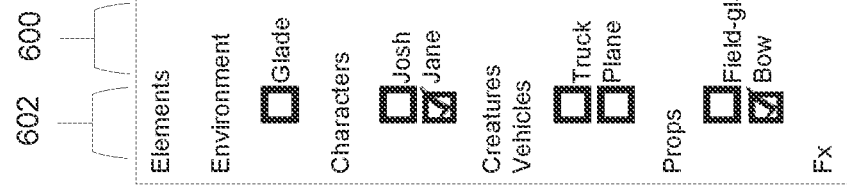
FIG. 6 shows an example of approaches panel from FIG. 2.
Figure 6:
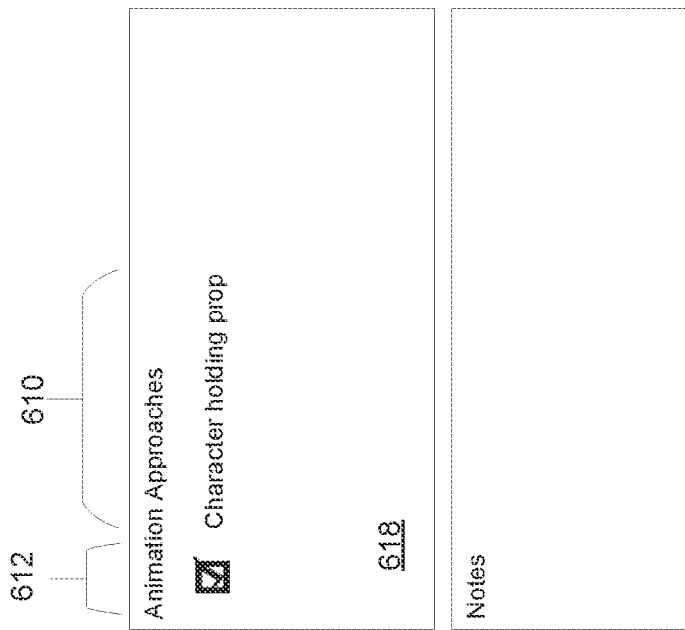

Window 200, as shown in FIG. 2, includes approaches panel 214. More detailed examples of approaches panel 214 are shown in FIG. 6 and FIG. 8 and are described below.

In an implementation, the window in which approaches panel 214 is presented is configured to provide more than one function to user 102. The window may include, for example, a function switch 216 that enables user 102 to toggle between window functions. One available function of the window is the provision of approaches panel 214. Another available function of the window is the provision of a category panel (not shown in FIG. 2) that is further described below.

In an implementation, whether to present approaches panel 214 or whether to present category panel to the user is determined by user actions elsewhere within window 200. GUI 106, for example, may use business logic to determine which panel to present to user 102 based at least on user activity within window 202. For example, the action of user 102 selecting a cell within production approaches category 207 causes approaches panel 214 to be displayed to user 102. In this case, business logic may determine that user 102 intends to add or modify an approach.

As shown in FIG. 2, approaches panel 214 includes an approaches workspace 218 and an elements workspace 220.

In an implementation, approaches workspace 218 displays a list of production approaches defined by user 102 in breakdown panel 202. The list of production approaches may include all production approaches from breakdown panel 202, or at least some of the production approaches. Elements panel 220 displays a list of production elements also defined by user 102 in breakdown panel 202. As will be described below (see FIG. 6), approaches panel 214 is configured to receive a user selection of association(s) between at least one of the production approaches shown in approaches workspace 218 and at least one of the production elements shown in elements panel 220.

As will be described in further detail below, additions and amendments to the contents of at least one of breakdown panel 202, element panel 208 and approaches panel 214 causes changes in the data displayed in the breakdown panel 202, element panel 208 and/or approaches panel 214. This automatic population has the potential to provide an auditing tool for user 102 to ensure continuity between scenes.

The window 200 of the GUI 106 can adjust the information displayed based on a role of the user viewing the window 200. The role of user viewing the window can be defined based on a particular production department in which the user works, such as animation, special effects, shading, accounting, management, etc.

For example, if the user is an animator, the GUI 106, for the single scene 'Jake is swimming in the water', can show "Jake" under "Elements" and "swim" under "Approaches." In another example, if the user is a shading artist, the GUI 106, for the single scene 'Jake is swimming in the water', can show "Jake" under "Elements" and "wet shading" under "Approaches." If the user is a special effects artist, the GUI 106 can show "water" under "Elements" and "splashing" under "Approaches." The GUI 106 can receive an input from the user defining the user's role, or the GUI can identify the user's role based on the user's login. Based on the user's login, the interface layer 110 in FIG. 1 can retrieve from the data store 108 in FIG. 1 the user's role in the organization and based on the role present the appropriate window 200.

In addition, the window 200 of the GUI 106 can show approaches and elements in a scene, a sequence, or across sequences. One sequence contains one or more scenes, and the script contains one or more sequences. By enabling the user to view how approaches to an element vary across multiple scenes in a sequence, the interface layer 110 can ensure continuity across scenes, or across sequences.

For example, scenes 1, 2 and 3 form a sequence. The script in scene 1 can state "Jake is carrying a gun." The elements for scene 1 can specify "Jake" and "gun". Alternatively, the elements for scene 1 can specify "Jake variant with a gun," thus indicating that the character included in scene 1 is a variant of Jake carrying a gun. In scene 2, the script can state "Jake is running across the field." The elements for scene 2 can specify "Jake". In scene 3, the script can state "Jake is firing the gun." The elements in scene 3 can specify "Jake" and "gun", or "Jake variant with a gun." Since in scene 2, the script does not explicitly state that Jake has a gun, the elements in scene 2 can leave "gun" out of the "Elements" 206 panel. If the user views the whole sequence, the user can identify the discontinuity in scene 2, namely, that Jake does not have a gun. Consequently, the user can add "gun" as an element to scene 2.

Alternatively, the interface layer 110 can automatically identify discontinuities between elements in a sequence, and provide a suggestion to a user how to fix the discontinuity. Specifically, in the above example, the interface layer 110 can detect a discontinuity, namely, that scene 2 is missing a gun, while scenes 1 and 3 contain a gun. The interface layer 110 can query the user whether to add "gun" is an element to scene 2, and/or whether to include "Jake variant with a gun" in scene 2.

It will be appreciated that the placement and sizing of panels shown in window 200 may be determined by user 102. For example, user 102 may reposition at least one panel within window 200 using a drag and drop action. Panels may be hidden, made visible, resized and/or dragged into other locations.

Figure 3:
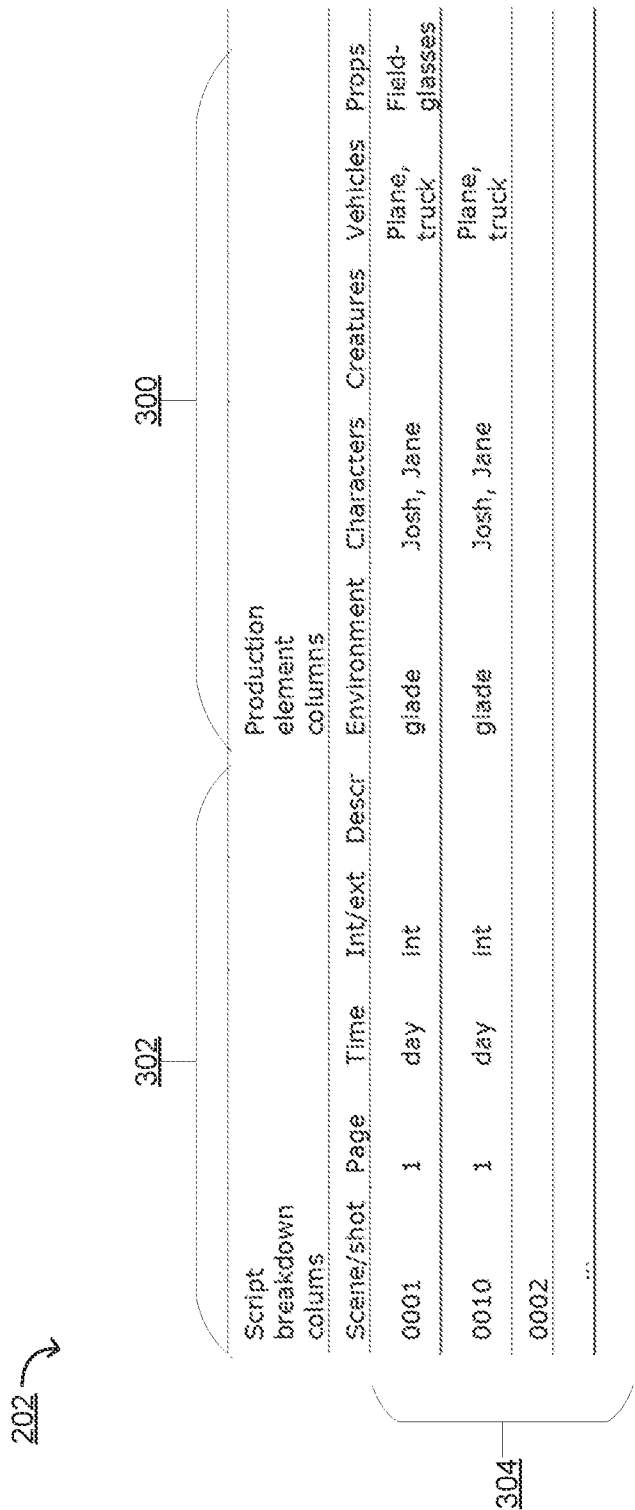
FIG. 3 shows an example of a breakdown panel from FIG. 2.

FIG. 3 shows a more detailed example of breakdown panel 202 (see FIG. 2) and shows, for the purposes of explanation, sample data that may be entered by user 102 relating to production elements.

As shown in FIG. 3, breakdown panel 202 includes a plurality of production element columns 300. These production element columns are grouped into a plurality of production element categories. Examples of production element categories shown in FIG. 3 include Environment, Characters, Creatures, Vehicles, and Props.

Also shown in FIG. 3 is that breakdown panel 202 includes a plurality of script breakdown columns 302. Examples of script breakdown columns include a scene or shot identifier, a page number of script 104 on which a scene appears, a time at which the scene is set (for example dawn, day, night etc), a location flag signaling whether the scene is interior or exterior, and a description.

Breakdown panel 202 as shown in FIG. 3 further includes a plurality of scenes or shots 304 represented as individual rows. In an implementation, rows are distinguished from each other by including a unique scene identifier. Example scene identifiers include 0001, 0010, and 0002.

Scene 0001 for example includes an environment comprising a glade, two characters Josh and Neytiri, two vehicles (a plane and a truck), and a prop comprising field-glasses. Scene 0010 includes the same environment, characters, and vehicles as scene 0001 but does not include the field-glasses as a prop.

Some production elements might not exist in the initial version of the script and so would not be entered in breakdown panel 202. In an implementation, production elements may be added by user 102 at any time in the production pipeline. As production elements are added to breakdown panel 202, the new production elements appear, for example, in element panel 208 and approaches panel 214.

Figure 4:
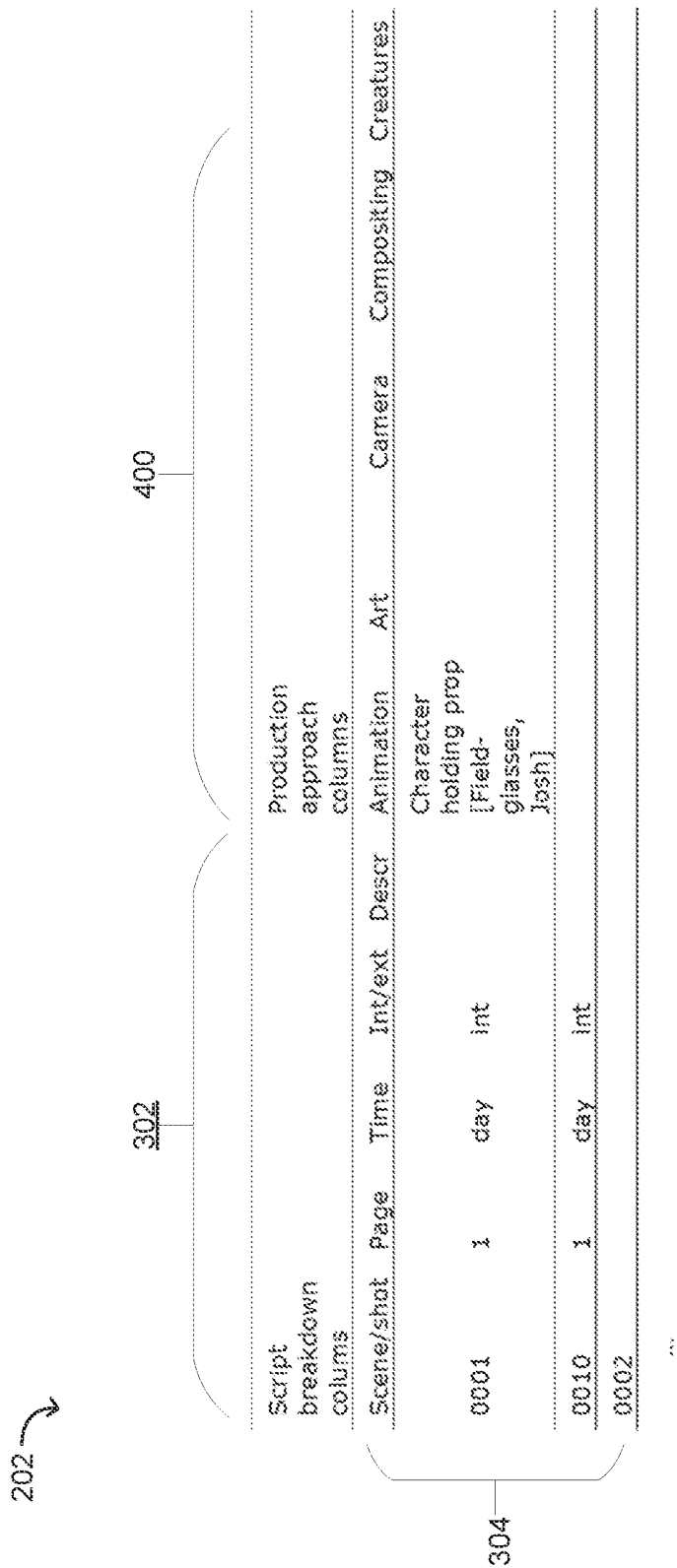
FIG. 4 shows a more detailed example of breakdown panel from FIG. 3.

FIG. 4 shows a more detailed example of breakdown panel 202 (see FIG. 2) and shows, for the purposes of explanation, some sample data relating to production approaches that may be entered by user 102, or populated by parser 120 (see FIG. 1).

As shown in FIG. 4, breakdown panel 202 includes a plurality of production approach columns 400. These production approach columns are associated to respective production approach categories. Examples of production approach categories shown in FIG. 4 include animation approaches, art approaches, camera approaches, compositing approaches, and creatures approaches.

Scene 0001 for example includes an animation approach comprising character holding prop. This animation approach specifies Josh as the character and Field-Glasses as the prop. Scene 0010 does not include the animation approach associated to Scene 0001. In Scene 0010, Josh is not holding Field-glasses.

User 102 may specify an approach required for a particular creature for example. Certain creatures may require a lot of bespoke work on that character relating to animation and hair. Such creatures require a very manual approach. In other cases, an approach will be very mechanical that won't need much human intervention. Such automated approaches include crowd scenes.

User 102 may specify a manual approach or an automated approach. For example, some background characters may be affiliated with an automated approach, while hero characters may be affiliated with a manual approach. The names of both approaches may be displayed in a list within a cell. The cell may appear within a row thereby indicating a scene or shot to which the cell is associated.

FIG. 5 shows a more detailed example of element panel 208 (see FIG. 2) and shows, for the purposes of explanation, some sample data that may be displayed to user 102. Element panel 208 displays different types of production elements that are called out in a script.

As shown in FIG. 5, element panel 208 includes a plurality of production element rows 500. User 102 has selected the 'Characters' production element group within the production element filter 212. Therefore, the rows presented in element panel 208 represent the characters Josh and Neytiri respectively.

In an implementation, as a user selection of a production element group is received, the production elements associated to that production element group are displayed in element panel 208.

In an implementation, user 102 may enter production elements into breakdown panel 202. As production elements are entered, or amended, in breakdown panel 202, element panel 208 is populated with the new or amended production element data. In an implementation, user 102 may cause changes to be made to production elements within the element panel 208. As these changes are made, the amended production elements are displayed in breakdown panel 202.

In an implementation, where user 102 makes a change to a production element, for example the name of a production element, that change of name is updated in all instances within breakdown panel 202. For example, changing the name of a character in one panel causes the name of the character to be changed in each scene within breakdown panel 202.

FIG. 6 shows a more detailed example of approaches panel 214 (see FIG. 2) providing the production approach function. Approaches panel 214 shows, for the purposes of explanation, sample data relating to production approaches and production elements.

In an implementation, at least one production approach is displayed within approaches workspace 218. For example, approaches workspace 218 may have displayed within it a list of production approaches that user 102 has entered into breakdown panel 202 (see FIG. 2). If user 102 selects a cell in the 'art approaches' column for example, at least some of the art approaches are displayed as a list 610 in approaches workspace 618.

Where a list of production approaches is presented, approaches workspace 218 may be configured to receive a user selection of one of the production approaches displayed within approaches workspace 218.

For example, approaches workspace 618 includes at least one production approach user selection indicator. Examples of production element user selection indicators are indicated at 612. One example of a set of user selection indicators 612 includes a plurality of check boxes associated to respective production approaches displayed within approaches workspace 618. The check boxes are configured to receive a user selection that has the effect of toggling at least one of the check boxes between a user selected state in which a check mark is displayed and a user non-selected state in which no check mark is displayed.

In another example, breakdown panel 202 is configured to receive a user selection of a production approach displayed in breakdown panel 202. In this case, approaches workspace 218 may be configured to display only the production approach that has been selected by user 102 within breakdown panel 202.

For the purposes of explanation, the production approach shown in approaches workspace 218 comprises 'character holding prop'. It is assumed that this animation approach has been selected by the user within approaches workspace 218 and/or selected by the user within breakdown panel 202.

The production approach shown in approaches workspace 218 is associated to a scene or shot displayed in breakdown panel 202. Where multiple production approaches are displayed, the production approaches are associated to respective scenes or shots displayed in breakdown panel 202. For example, the production approach 'character holding prop' may appear in a plurality of scenes or shots shown in breakdown panel 202. Each instance of 'character holding prop' may be associated to a set of production elements. Different instances of 'character holding prop' may be associated to different sets of production elements.

Also shown in FIG. 6 is elements workspace 220 populated with sample data for the purposes of explanation. Elements workspace 220 may display, for example, a list 600 of production elements displayed in breakdown panel 202. In an implementation, each production element displayed in breakdown panel 202 is displayed in elements workspace 220.

In an implementation, at least some of the production elements are grouped by production element categories. For example, characters Josh and Neytiri are displayed as grouped together under the characters category. Vehicles 'truck' and 'plane' are displayed as grouped together under the vehicles category.

In an implementation, elements workspace 220 includes at least one production element user selection indicator. Examples of production element user selection indicators are indicated at 602. One example of a set of user selection indicators 602 includes a plurality of check boxes associated to respective production elements displayed within elements workspace 220. The check boxes are configured to receive a user selection that has the effect of toggling at least one of the check boxes between a user selected state in which a check mark is displayed and a user non-selected state in which no check mark is displayed.

As shown in FIG. 6, user 102 has selected character element 'Neytiri', and prop element 'bow'. The remaining production elements displayed in elements workspace 220 are not currently selected by user 102.

In an implementation, as user 102 selects a character element within elements workspace 220, the selected character element is caused to be associated with a production approach that is active within approaches workspace 218. For example, selecting 'Neytiri' and 'bow' within elements workspace 220 has the effect of associating these selected production elements with the animation approach 'character holding prop'. On the other hand, de-selecting elements within elements workspace 220 has the effect of removing an association of the de-selected production elements within the animation approach 'character holding prop'.

User 102 may select, for example, a cell within breakdown panel. The cell may lie within the art approach column which indicates that user 102 is interested in an art approach. The cell may lie within a row associated with a scene or shot which indicates which scene or shot user 102 is interested in. At least one art approach may be displayed as a list in approaches workspace 618. At least one production element defined in the scene or shot of interest to the user may be displayed in elements workspace 620. User 102 may then affiliate at least one production element displayed in elements workspace 620 with at least one art approach displayed in approaches panel 618.

Approaches workspace 618 may include specific notes and may imply coordination between departments. For example, the animation approach 'character holding prop' signals that there is a requirement for coordination between the modelling department for the prop and the creatures department for the character. This relationship has the potential to assist departments in priority and scheduling within the production pipeline. If a prop is involved in an animation approach then the modelling department may need to prioritise the prop.

It is anticipated that some approaches will be reused across more than one script. For example, the approach 'character holding prop' will look fairly similar across shows and is therefore reusable at least across scenes and shots within a script.

Figure 7:
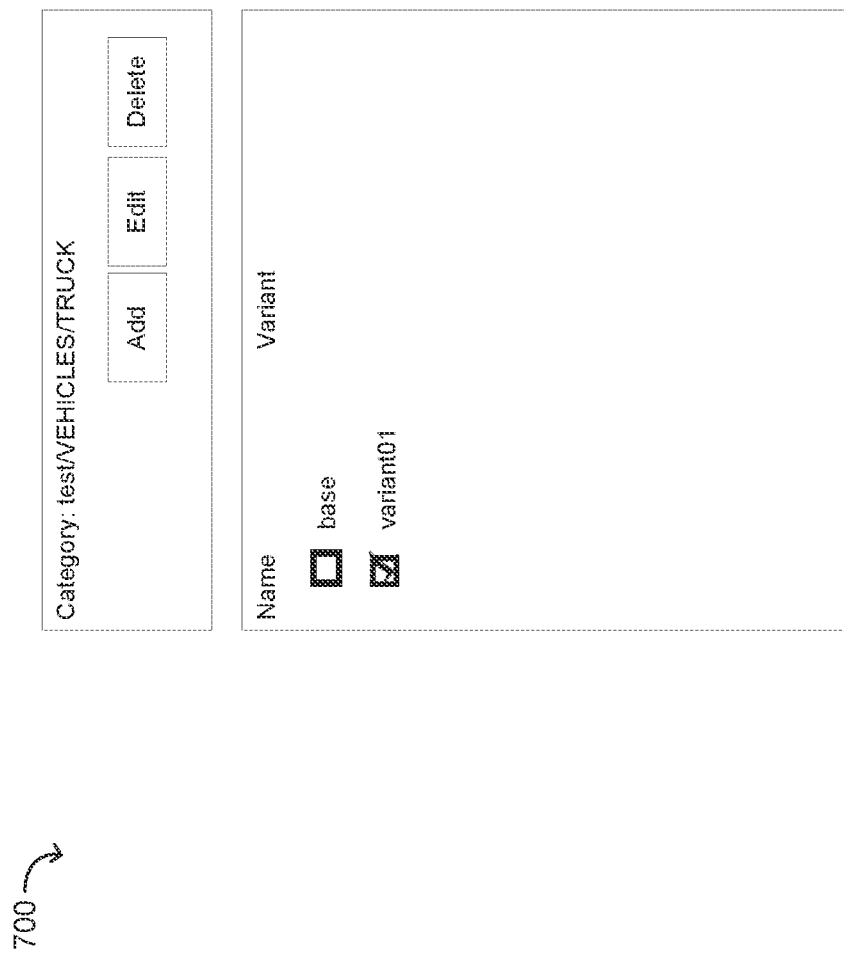
FIG. 7 shows an example of a category panel.

FIG. 7 shows an example of category panel 700. This panel is referred to in FIG. 2 as selectable using function switch 216. Category panel 700 shows, for the purposes of explanation, sample data relating to production elements.

In an implementation, user 102 selects a production element within element panel 208 (see FIG. 2). User 102 may select, for example, the 'vehicles' category, and 'truck' within the 'vehicles' category.

Maintained in data store 108 may be, for example, a representation of defining characteristics of a base version of at least one production element. For example, a 'base' version of a truck may be maintained in data store 108. This base version of the truck may specify, for example, a truck that is pure and pristine.

As shown in FIG. 7, category panel 214 is configured to receive a user definition of a variant. User 102 may specify, for example, that a particular scene or shot requires a truck, and that the truck is a variant from the base or standard definition of the truck. For example, a scene may call for a truck with bullet holes. User 102 may select a base version of the truck and then define a variant of the truck that includes bullet holes.

It is also envisaged that the same character may have at least one variant or form that may appear in different scenes. In an implementation, GUI 200 is configured to populate a scene with a variant that has been selected at least partly form automated reasoning and/or artificial intelligence. Where automation is implemented, such automated selection may be changed manually by user 102.

In an implementation, category panel 700 receives from user 102 at least one variation and displays the variations in separate rows in the category panel 700. The variations collectively define a variant that can be user specified and used as a production element in place of the base version of the truck.

Once user 102 has defined the truck variant, element panel 208 is updated to display the variant as appearing in the relevant scene or shot.

According to one implementation, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 8 is a block diagram that illustrates a computer system 800 upon which the computer systems of the system 100 (see FIG. 1) and/or the visual content generation system 900 (see FIG. 9) may be implemented. The computer system 800 includes a bus 802 or other communication mechanism for communicating information, and a processor 804 coupled with the bus 802 for processing information. The processor 804 may be, for example, a general purpose microprocessor.

The computer system 800 also includes a main memory 806, such as a random access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a computer monitor, for displaying information to a computer user. An input device 814, including alphanumeric and other keys, is coupled to the bus 802 for communicating information and command selections to the processor 804. Another type of user input device is a cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement the techniques described herein using customized hard-wired logic, one or more ASICs or FPGAs, firmware and/or program logic which in combination with the computer system causes or programs the computer system 800 to be a special-purpose machine. According to one implementation, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In other implementations, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 810. Volatile media includes dynamic memory, such as the main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may initially be carried on a magnetic disk or solid state drive of a remote computer. The remote computer can load the instructions into its dynamic memory and send the instructions over a network connection. A modem or network interface local to the computer system 800 can receive the data. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), the network link 820, and communication interface 818. In the Internet example, a server 830 might transmit a requested code for an application program through the Internet 828, ISP 826, local network 822, and communication interface 818. The received code may be executed by the processor 804 as it is received, and/or stored in the storage device 810, or other non-volatile storage for later execution.

Figure 9:
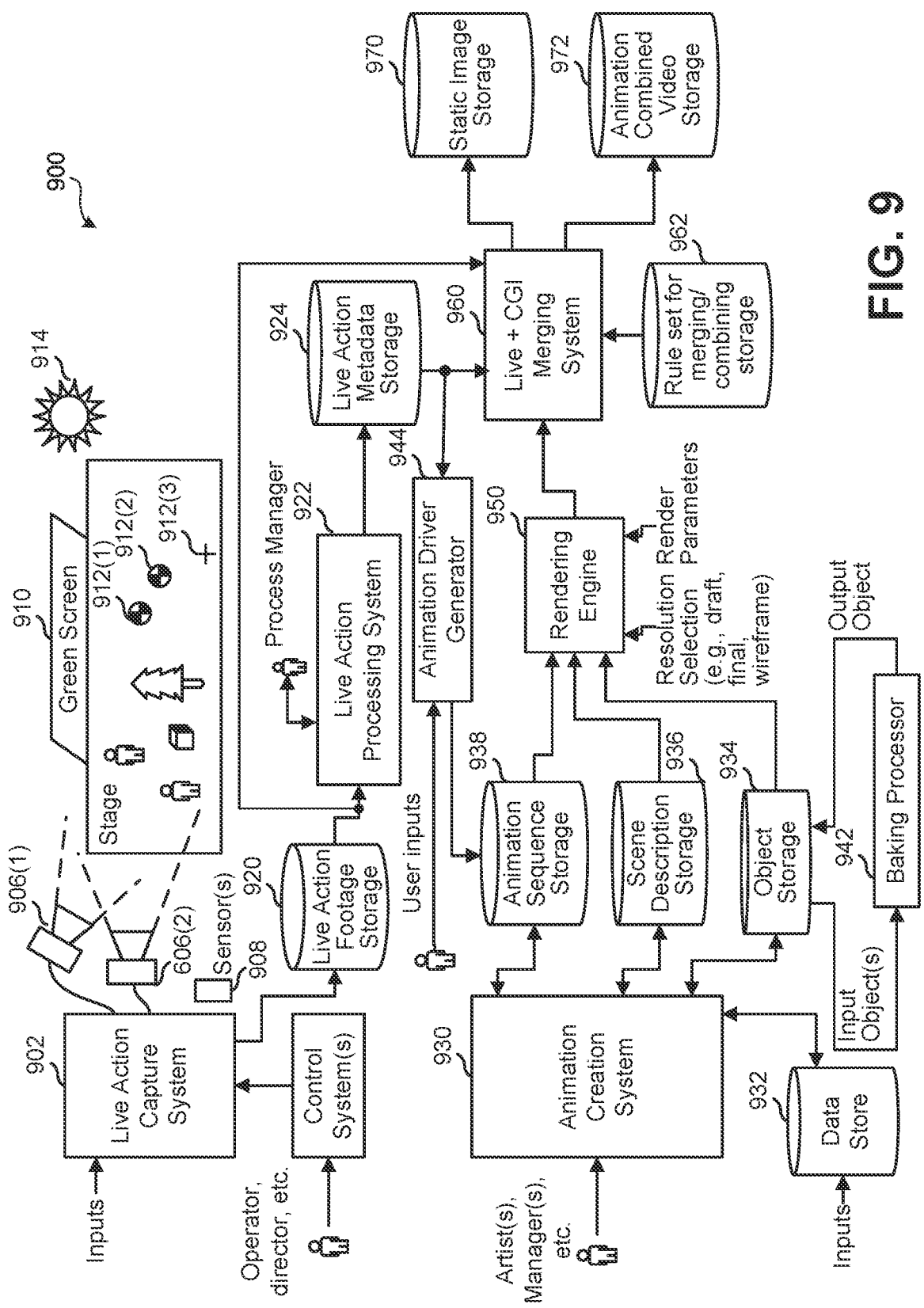
FIG. 9 illustrates an example visual content generation system as might be used to generate imagery in the form of still images and/or video sequences of images.

For example, FIG. 9 illustrates the example visual content generation system 900 as might be used to generate imagery in the form of still images and/or video sequences of images. The visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. The live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On the stage 904, there might be human actors, animal actors, inanimate objects, background objects, and possibly an object such as a green screen 910 that is designed to be captured in a live scene recording in such a way that it is easily overlaid with computer-generated imagery. The stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, the live action capture system 902 might output live action footage to a live action footage storage 920. A live action processing system 922 might process live action footage to generate data about that live action footage and store that data into a live action metadata storage 924. The live action processing system 922 might include computer processing capabilities, image processing capabilities, one or more processors, program code storage for storing program instructions executable by the one or more processors, as well as user input devices and user output devices, not all of which are shown. The live action processing system 922 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 914, as that might be useful in post-processing to match computer-generated lighting on objects that are computer-generated and overlaid on the live action footage. The live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of the visual content generation system 900. The animation creation system 930 might include computer processing capabilities, image processing capabilities, one or more processors, program code storage for storing program instructions executable by the one or more processors, as well as user input devices and user output devices, not all of which are shown. The animation creation system 930 might be used by animation artists, managers, and others to specify details, perhaps programmatically and/or interactively, of imagery to be generated. From user input and data from a database or other data source, indicated as a data store 932, the animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 930 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 932 might be used to drive object presentation. For example, if an artist is creating an animation of a spaceship passing over the surface of the Earth, instead of manually drawing or specifying a coastline, the artist might specify that the animation creation system 930 is to read data from the data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene, and generate corresponding animation parameters to be stored in the animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 922. The animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 950 might include computer processing capabilities, image processing capabilities, one or more processors, program code storage for storing program instructions executable by the one or more processors, as well as user input devices and user output devices, not all of which are shown.

The visual content generation system 900 can also include a merging system 960 that merges live footage with animated content. The live footage might be obtained and input by reading from the live action footage storage 920 to obtain live action footage, by reading from the live action metadata storage 924 to obtain details such as presumed segmentation in captured images segmenting objects in a live action scene from their background (perhaps aided by the fact that the green screen 910 was part of the live action scene), and by obtaining CGI imagery from the rendering engine 950.

A merging system 960 might also read data from a rulesets for merging/combining storage 962. A very simple example of a rule in a ruleset might be "obtain a full image including a two-dimensional pixel array from live footage, obtain a full image including a two-dimensional pixel array from the rendering engine 950, and output an image where each pixel is a corresponding pixel from the rendering engine 950 when the corresponding pixel in the live footage is a specific color of green, otherwise output a pixel value from the corresponding pixel in the live footage."

The merging system 960 might include computer processing capabilities, image processing capabilities, one or more processors, program code storage for storing program instructions executable by the one or more processors, as well as user input devices and user output devices, not all of which are shown. The merging system 960 might operate autonomously, following programming instructions, or might have a user interface or programmatic interface over which an operator can control a merging process. In some implementations, an operator can specify parameter values to use in a merging process and/or might specify specific tweaks to be made to an output of the merging system 960, such as modifying boundaries of segmented objects, inserting blurs to smooth out imperfections, or adding other effects. Based on its inputs, the merging system 960 can output an image to be stored in a static image storage 970 and/or a sequence of images in the form of video to be stored in an animated/combined video storage 972.

Thus, as described, the visual content generation system 900 can be used to generate video that combines live action with computer-generated animation using various components and tools, some of which are described in more detail herein. While the visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Figure 10:
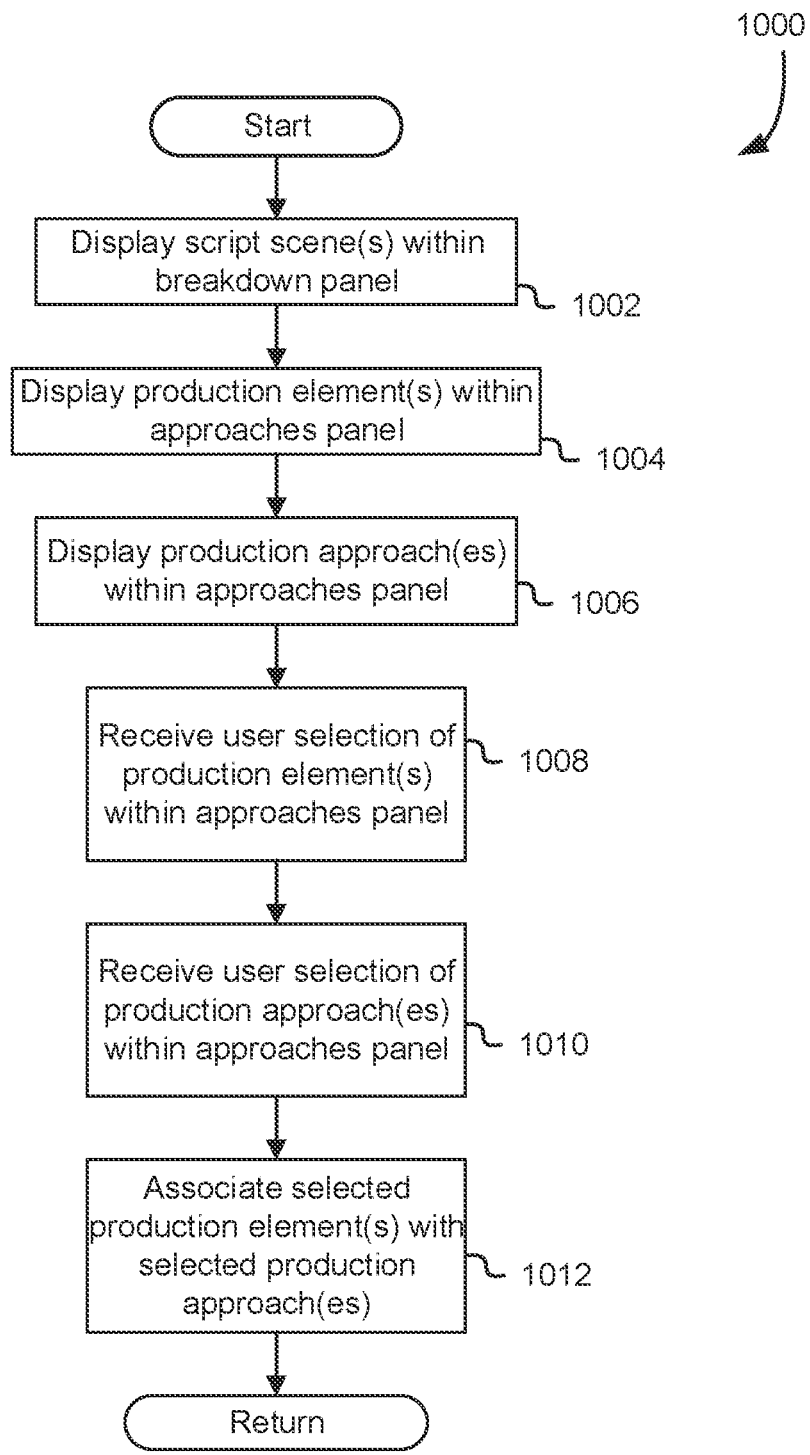
FIG. 10 shows an example of a method of managing associations between production elements and production approaches using the GUI of FIG. 2.

FIG. 10 shows an example of a method 1000 of managing associations between production elements and production approaches using, for example, GUI 106 (see FIG. 1).

Method 1000 includes displaying 1002 at least one scene obtained from script 104. In an implementation, the scene(s) is/are displayed within breakdown panel 202 (see FIG. 2). Any production elements associated with the scenes are also displayed within breakdown panel 202.

Method 1000 further includes displaying 1004 at least some of the production elements that are displayed within breakdown panel 202. The production elements are displayed within approaches panel 214 (see FIG. 2).

In an implementation, the production elements are displayed within elements workspace 220. Displayed within elements workspace is a list of production elements 600 (see FIG. 6), and associated respective user selection indicators 602, for example check boxes.

Method 1000 further includes displaying 1006 at least one production approach. In an implementation, the production approach(es) is/are displayed in approaches workspace 218 within approaches panel 214.

Method 1000 includes receiving 1008 a user selection of at least one production element displayed within approaches panel 214, and receiving 1010 a user selection of at least one production approach. In an implementation, user 102 operates input device 814 (see FIG. 8) and cursor control 816 while viewing display 812.

The method 1000 can include obtaining the script and separating the script into a multiple scenes. For each scene among the multiple of scenes method 1000 can perform natural language processing. Based on the natural language processing, the method 1000 can identify a production element and a production approach associated with each scene in the plurality of scenes. The method 1000 can populate the breakdown panel with the production element and the production approach associated with each scene in the plurality of scenes. The method 1000 can be performed automatically by a hardware or software processor executing instructions described in this application.

Method 1000 can include displaying, within the breakdown panel, a plurality of cells within a plurality of script rows. The representation of the at least one scene may be displayed within a plurality of cells within at least one of the script rows.

Method 1000 can further include displaying, within the breakdown panel, at least some of the plurality of cells within a plurality of production approach columns. At least some of the plurality of production approaches may be associated to respective production approach categories.

A user may select at least one cell of the plurality of cells within the breakdown panel. On receiving such a user selection, method 1000 may display, within the approaches panel, a representation of at least one production approach associated with the user-selected cell; and display, within the approaches panel, a representation of at least one production element associated with the user-selected cell.

A user may define a new production element within the breakdown panel. On receiving such a user definition, method 1000 may display the new production element in an element panel and/or the approaches panel.

A user may amend a production element within the breakdown panel. On receiving such a user amendment, method 1000 may display the amended production element in an element panel and/or the approaches panel.

A user may amend a production element within an element panel. On receiving such a user amendment, method 1000 may display the amended production element in the breakdown panel and/or the approaches panel.

Method 1000 may include displaying, within a category panel, a representation of at least one production element; and receiving, within the category panel, a user definition of a variant based at least partly on the at least one production element displayed in the category panel.

Method 1000 may include displaying, within the breakdown panel, at least some of the plurality of cells within a plurality of production element columns. At least some of the plurality of production elements columns may be associated to respective production element categories.

Method 1000 may include displaying an approaches workspace within the approaches panel; and presenting the representation of at least one production approach and associated respective production approach user selection indicators within the approaches workspace.

Method 1000 may include displaying an elements workspace within the approaches panel; and presenting the representation of at least some of the plurality of production elements and associated respective production element user selection indicators within the elements workspace.

The production element(s) and production approach(es) selected by user 102 are then associated with each other. The associations may be stored in data store 108 for example.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
obtaining a script indicating multiple scenes, multiple production elements, and multiple production approaches,
wherein a production element among the multiple production elements is associated with a noun in the script,
wherein a production approach is associated with a verb or an adjective in the script;
identifying a subset of multiple scenes among the multiple scenes, wherein the subset of multiple scenes includes the production element and the production approach;
creating a correspondence between the production element, the production approach, and the subset of multiple scenes;
receiving a change to at least one of the production element or the production approach; and
automatically propagating the change to each scene among the subset of multiple scenes.

2. The method of claim 1 comprising:
obtaining the script;
separating the script into the multiple scenes;
iterating through each scene among the multiple scenes by performing natural language processing associated with the each scene;
based on the natural language processing, identifying a production element and a production approach associated with each scene among the multiple scenes; and
creating a presentation comprising the production element and the production approach associated with the each scene among the multiple scenes.

3. The method of claim 1 comprising:
obtaining a role associated with a user; and
based on the role associated with the user, creating a presentation associated with the production element and the production approach relevant to the role associated with the user.

4. The method of claim 1 comprising:
obtaining a role associated with a user; and
upon receiving the change to at least one of the production element or the production approach,
wherein the change impacts the production element or the production approach presented to the user,
enabling the user to ensure continuity between the multiple scenes by presenting to the user the change, the production element, and the production approach associated with the multiple scenes.

5. The method of claim 1 comprising:
receiving a modification to the automatically propagated change from a user; and
modifying the automatically propagated change based on the modification.

6. The method of claim 1 wherein the production approach comprises special effects associated with a scene among the multiple scenes, a shading associated with the scene, or an animation effect associated with the scene.

7. The method of claim 1 wherein the production approach specifies a relationship between two or more production elements.

8. The method of claim 1 wherein the production element comprises characters, creatures, vehicles or props.

9. At least one computer-readable storage medium, excluding transitory signals and carrying instructions, which, when executed by at least one data processor of a system, cause the system to:
obtain a script indicating multiple scenes, multiple production elements, and multiple production approaches,
wherein a production element among the multiple production elements is associated with a noun in the script, wherein a production approach is associated with a verb or an adjective in the script;
identify a subset of multiple scenes among the multiple scenes, wherein the subset of multiple scenes includes the production element and the production approach;
create a correspondence between the production element, the production approach, and the subset of multiple scenes;
receive a change to at least one of the production element or the production approach; and
automatically propagate the change to each scene among the subset of multiple scenes.

10. The computer-readable storage medium of claim 9 comprising instructions to:
obtain the script;
separate the script into the multiple scenes;
iterate through each scene among the multiple scenes by performing natural language processing associated with the each scene;
based on the natural language processing, identify a production element and a production approach associated with each scene among the multiple scenes; and
create a presentation comprising the production element and the production approach associated with the each scene among the multiple scenes.

11. The computer-readable storage medium of claim 9 comprising instructions to:
obtain a role associated with a user; and
based on the role associated with the user, create a presentation associated with the production element and the production approach relevant to the role associated with the user.

12. The computer-readable storage medium of claim 9 comprising instructions to:
obtain a role associated with a user; and
upon receiving the change to at least one of the production element or the production approach,
wherein the change impacts the production element or the production approach presented to the user,
enable the user to ensure continuity between the multiple scenes by presenting to the user the change, the production element, and the production approach associated with the multiple scenes.

13. The computer-readable storage medium of claim 9 comprising instructions to:
receive a modification to the automatically propagated change from a user; and
modify the automatically propagated change based on the modification.

14. The computer-readable storage medium of claim 9, wherein the production approach comprises special effects associated with a scene among the multiple scenes, a shading associated with the scene, or an animation effect associated with the scene.

15. The computer-readable storage medium of claim 9, wherein the production approach specifies a relationship between two or more production elements.

16. The computer-readable storage medium of claim 9, wherein the production element comprises characters, creatures, vehicles or props.

17. A system comprising:
at least one hardware processor; and
at least one non-transitory memory storing instructions, which, when executed by the at least one hardware processor, cause the system to:
obtain a script indicating multiple scenes, multiple production elements, and multiple production approaches,
wherein a production element among the multiple production elements is associated with a noun in the script,
wherein a production approach is associated with a verb or an adjective in the script;
identify a subset of multiple scenes among the multiple scenes, wherein the subset of multiple scenes includes the production element and the production approach;
create a correspondence between the production element, the production approach, and the subset of multiple scenes;
receive a change to at least one of the production element or the production approach; and
automatically propagate the change to each scene among the subset of multiple scenes.

18. The system of claim 17 comprising instructions to:
obtain the script;
separate the script into the multiple scenes;
iterate through each scene among the multiple scenes by performing natural language processing associated with the each scene;
based on the natural language processing, identify a production element and a production approach associated with each scene among the multiple scenes; and
create a presentation comprising the production element and the production approach associated with the each scene among the multiple scenes.

19. The system of claim 17 comprising instructions to:
obtain a role associated with a user; and
based on the role associated with the user, create a presentation associated with the production element and the production approach relevant to the role associated with the user.

20. The system of claim 17 comprising instructions to:
obtain a role associated with a user; and
upon receiving the change to at least one of the production element or the production approach,
wherein the change impacts the production element or the production approach presented to the user,
enable the user to ensure continuity between the multiple scenes by presenting to the user the change, the production element, and the production approach associated with the multiple scenes.

21. The system of claim 17 comprising instructions to:
receive a modification to the automatically propagated change from a user; and
modify the automatically propagated change based on the modification.

22. The system of claim 17, wherein the production approach comprises special effects associated with a scene among the multiple scenes, a shading associated with the scene, or an animation effect associated with the scene.

23. The system of claim 17, wherein the production approach specifies a relationship between two or more production elements.

24. The system of claim 17, wherein the production element comprises characters, creatures, vehicles or props.

* * * * *